United States Patent
Osaki et al.

(10) Patent No.: US 7,594,072 B2
(45) Date of Patent: Sep. 22, 2009

(54) METHOD AND APPARATUS INCORPORATING VIRTUALIZATION FOR DATA STORAGE AND PROTECTION

(75) Inventors: Nobuyuki Osaki, Kanagawa (JP); Akira Yamamoto, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 323 days.

(21) Appl. No.: 11/521,466

(22) Filed: Sep. 15, 2006

(65) Prior Publication Data

US 2008/0072000 A1 Mar. 20, 2008

(51) Int. Cl.
*G06F 12/00* (2006.01)

(52) U.S. Cl. .................. 711/113; 711/162; 711/167; 711/170

(58) Field of Classification Search .......... 711/113, 711/165, 173, 153, 162, 167, 170
See application file for complete search history.

(56) References Cited

U.S. PATENT DOCUMENTS

| | | | |
|---|---|---|---|
| 7,062,624 B2 * | 6/2006 | Kano | 711/165 |
| 7,149,859 B2 * | 12/2006 | Fujibayashi | 711/162 |
| 2003/0065898 A1 * | 4/2003 | Flamma et al. | 711/165 |
| 2003/0126107 A1 | 7/2003 | Yamagami | |
| 2004/0073677 A1 * | 4/2004 | Honma et al. | 709/226 |
| 2004/0257857 A1 | 12/2004 | Yamamoto | |
| 2007/0143559 A1 * | 6/2007 | Yagawa | 711/170 |
| 2009/0006843 A1 * | 1/2009 | Bade et al. | 713/155 |

\* cited by examiner

*Primary Examiner*—Hyung S Sough
*Assistant Examiner*—Mehdi Namazi
(74) *Attorney, Agent, or Firm*—Mattingly & Malur, P.C.

(57) ABSTRACT

A virtualization apparatus presents a virtual volume to a computer that stores data to the virtual volume. The data is stored by the virtualization apparatus to a first logical volume at a first storage system. The first storage system includes data protection such that data stored to the first logical volume is copied to one or more second logical volumes, and the virtualization apparatus is able to switch paths to one or more of the second logical volumes during failover. When each write data is received from the computer by the virtualization apparatus, a sequence number corresponding to the write data is generated, and the write data and the corresponding sequence number are forwarded to the first storage system for storing to the first logical volume and the second logical volume. During failover, the sequence numbers are used to determine where to begin writing data to the second logical volume.

6 Claims, 15 Drawing Sheets

FIG. 3 — 105

| Local WWN | Local LUN | Storage System Name | WWN | LUN | Capacity |
|---|---|---|---|---|---|
| XXXX | 0000 | STORAGE 121 | AAAA | 0000 | 10GB |
| XXXX | 0001 | STORAGE 121 | BBBB | 0001 | 20GB |

| Source | | | | Target | | | |
|---|---|---|---|---|---|---|---|
| Storage System Name | WWN | LUN | Capacity | Storage System Name | WWN | LUN | Capacity |
| STORAGE 121 | AAAA | 0000 | 10GB | STORAGE 121 | AAAA | 0005 | 10GB |
| STORAGE 121 | BBBB | 0001 | 20GB | STORAGE 141 | JJJJ | 0000 | 20GB |

401, 402, 403, 404, 405, 406, 407, 408, 409, 410

| Storage System Name | WWN | LUN | Protection | Status |
|---|---|---|---|---|
| STORAGE 121 | AAAA | 0000 | Local snapshot | 10 min old |
| STORAGE 121 | DDDD | 0002 | Local snapshot | 1 hour old |
| STORAGE 141 | LLLL | 0001 | Remote Copy | 20 min old |

FIG. 7

METHOD AND APPARATUS INCORPORATING VIRTUALIZATION FOR DATA STORAGE AND PROTECTION

BACKGROUND OF THE INVENTION

1. Field of the Invention

The present invention relates generally to storage systems and data protection.

2. Description of Related Art

Small business organizations often have difficulty maintaining skilled employees for the management of storage systems, and also prefer to avoid the large upfront expenditure on their own mass storage system. Further, such organizations generally want storage capacity that is simplified and easily managed. One solution for these businesses is the outsourcing of the storage management and capacity by using a storage system that is installed at a third party data center, and maintained and operated by a storage service provider (SSP). Under this situation, data protection, which often requires complex operations such as paring of volumes, creating snapshots, monitoring network status, and planning total storage capacity, should be easily maintainable for both the small business storage customer and the SSP itself. Methods for data protection are disclosed in U.S. Pat. Appl. Pub. 2003/0126101 to Kenji Yamagami, filed Dec. 27, 2001, the disclosure of which is incorporated herein in its entirety.

One technique for facilitating ease of maintenance and operation of storage technology is through the application of virtualization to some parts of the system. A virtualization apparatus provides a virtual volume whose data is stored in a real volume in a first storage system. When the data on the virtual volume is copied to a mirror secondary volume in a second storage system, a management terminal may be used to issues commands to establish a path between the virtual volume and the secondary volume, and the management terminal may be used to control copy operations such as suspending or resuming copy. However, such a management terminal needs to be able to recognize the physical resources of the target secondary storage system in order to set up the remote copy function, which is not easily managed. Further, if the data is copied to the secondary volume from the primary volume, rather than from the virtual volume, then if the primary volume fails, recovery or continuing data writes to the secondary volume may be difficult to accomplish. Virtualization technology is disclosed in US Pat. Appl. Pub. No. 2004/0257857 to Yasutomo Yamamoto et al., filed Oct. 9, 2003, the disclosure of which is incorporated herein in its entirety.

SUMMARY OF THE INVENTION

In a system that uses a virtualization apparatus, the virtualization apparatus is able to switch to using a secondary volume when a primary volume fails. This relieves an application computer from having to change a path upon failure of the primary volume, which simplifies the configurations necessary for disaster recovery. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 3 illustrates an exemplary virtual volume mapping table.

FIG. 4 illustrates an exemplary recovery table.

FIG. 7 illustrates an exemplary table listing candidates for use as the alternative volume.

DETAILED DESCRIPTION OF THE INVENTION

Figure 1:
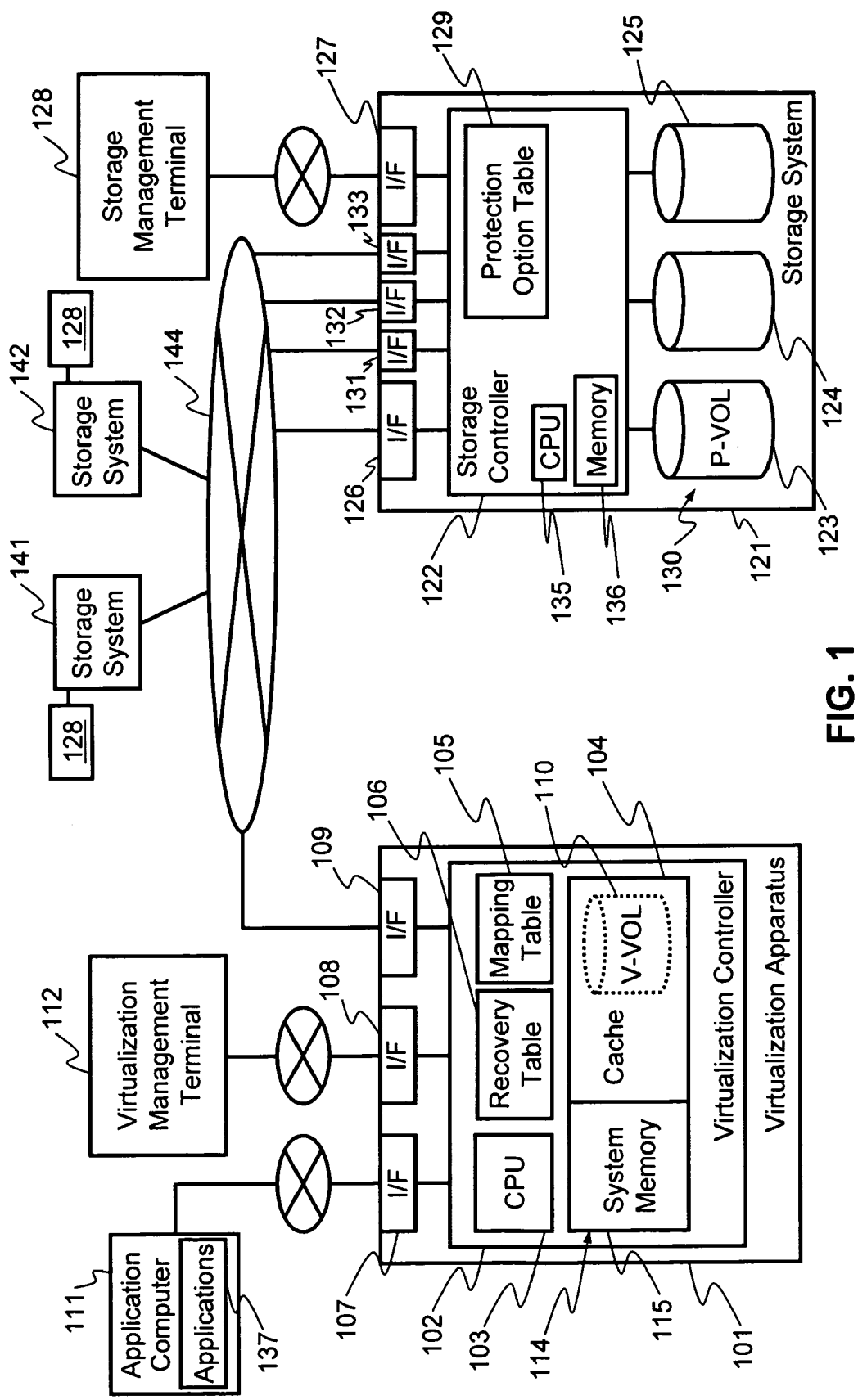
FIG. 1 illustrates an exemplary system architecture in which some embodiments of the invention are applied.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

System Configuration

Under one embodiment, a virtualization apparatus is installed between an application computer (host) and a first storage system. A real primary data volume (i.e., a logical volume corresponding to storage space in a physical storage media at a storage system) in the first storage system is provided for use of the application computer via a virtual volume presented by the virtualization apparatus so that it appears to the application computer as if the data contained in the primary volume is stored at the virtualization apparatus. In order to provide backup and recovery functions for data protection, the data of the primary volume in the first storage system is also copied to a secondary logical volume located either in the first storage system, or in a second storage system separate from the first storage system. When choosing the primary volume of the first storage system, the virtualization apparatus also retrieves information on the secondary volume, such as the path information. The virtualization apparatus is able to readily start to use the secondary volume if the primary volume should fail. As a result, the application computer does not have to change the path upon failure of the primary volume, which makes the configurations necessary for disaster recovery operations easier for the administrator of the application computer to manage. Also, complex and cumbersome operations to maintain and monitor remote copy configurations can be performed at the data center that manages the real storage resources (i.e., the storage systems), leaving a certain level of freedom and flexibility for the administrator managing the virtualization apparatus.

FIG. 1 illustrates an exemplary architecture and system configuration in which a first embodiment of the invention may be applied. The system includes a virtualization device 101 for presenting a virtual volume (V-VOL) 110. Virtualization apparatus 101 comprises a controller or intelligent switch 102 that includes a CPU 103, a memory 114 that includes a system memory 115 and a cache 104, a virtual volume mapping table 105, and a recovery table 106. Mapping table 105 contains information as described in FIG. 3 below, while recovery table 106 contains information as described in FIG. 4 below.

Virtualization device 101 also includes one or more interfaces (I/Fs) 107 for enabling communication with information processing devices such as one or more application computers 111, having one or more applications 137 running thereon. Interface 107 is preferably Fibre Channel (FC) protocol but may also be other types of protocols, such as Internet Protocol (IP), SCSI, WiFi, Ethernet, and the like. Also included may be an interface 108 for enabling communication with a virtualization management terminal 112, such as through IP access, although other protocol types such as those discussed above may be used. Further, an external interface 109 is included for connecting to one or more external storage systems 121, 141, 142 via a network 144, which may be an FC, IP, or other type of network mentioned above.

Virtual volume 110 is presented by virtualization apparatus 101 to application computer 111, so that application computer 111 is able to store data to and read data from virtual volume 110 as if it were an actual storage volume. The real volume, which in this example is primary volume (P-VOL) 123, is mapped using the virtual volume 110. Primary volume 123 is a logical volume that is allocated an amount of storage space on a storage media 130. Storage system 121 includes a controller 122 that controls the reading of data from and writing of data to storage media 130. Controller 122 typically includes a controller CPU 135 and a controller memory 136 that includes system memory and a cache. Storage media 130 is preferably a plurality of magnetic disks (hard disk drives) arranged in a RAID (redundant array of independent disks) configuration, but magnetic disks in other configurations, such as JBOD (just a bunch of disks), or direct access may also be used. Further, in place of magnetic disks, other random access rewriteable storage media may be used, such as nonvolatile solid state memory, optical storage, or the like.

The mapping information is stored in the virtual volume mapping table 105, as is discussed below. Application computer 111 accesses the virtual volume 110 as if virtual volume 110 is a real volume, while mapping table 105 is used to map the data to the primary volume 123. Thus, data written from the application computer 111 to virtual volume 110 is stored in cache 104 temporarily, and then the data is written to primary volume 123 according to mapping table 105. Read operations requested by application computer 111 are similarly obtained using the mapping table 105, unless the requested data is already contained in cache 104 due to recent read or write operations.

Virtualization management terminal 112 is used to manage the configuration of virtualization apparatus 101. Virtualization management terminal 112 is connected to virtualization apparatus 101 via interface 108, and enables a user, such as a virtualization administrator, to configure the virtualization apparatus, such as for setting up virtual volume 110, choosing a primary volume, and monitoring their operation as will be described below.

Storage system 121 and storage systems 141, 142 are storage systems able to communicate with virtualization apparatus 101 via network 144. In the example shown, storage system 121 is illustrated in detail, with it being understood that storage systems 141, 142 may be similarly constructed. Storage system 121 includes storage controller 122 that controls basic operation of the storage system such as storing to and retrieving data from the storage media 130, allocation of storage space in the media as logical volumes, and the like. Storage system 121 may include one or more logical volumes, 123, 124, 125 which are allocated space on storage media 130. Storage system 121 includes one or more interfaces for enabling communication with network 144. Some or all of these interfaces 126, 131, 132, 133 are compatible with the protocol used on network 144, which as discussed above may be FC, IP, Ethernet, SCSI, WiFi, or the like. Storage system 121 also includes a management interface 127 to enable connection with a storage management terminal 128. Storage management terminal 128 is able to communicate with storage system 121, such as via IP protocol, Ethernet, or other protocol, through interface 127. Storage management terminal 128 is used by the SSP for configuring the storage system 121 such as for setting up storage operations, allocating logical volumes, configuring local and remote copy functions, and the like. Further, controller 122 or management terminal 128 may include a protection option table 129 that contains options of the protection mechanisms available for the volumes in storage system 121, as will be described in greater detail below.

Figure 2:
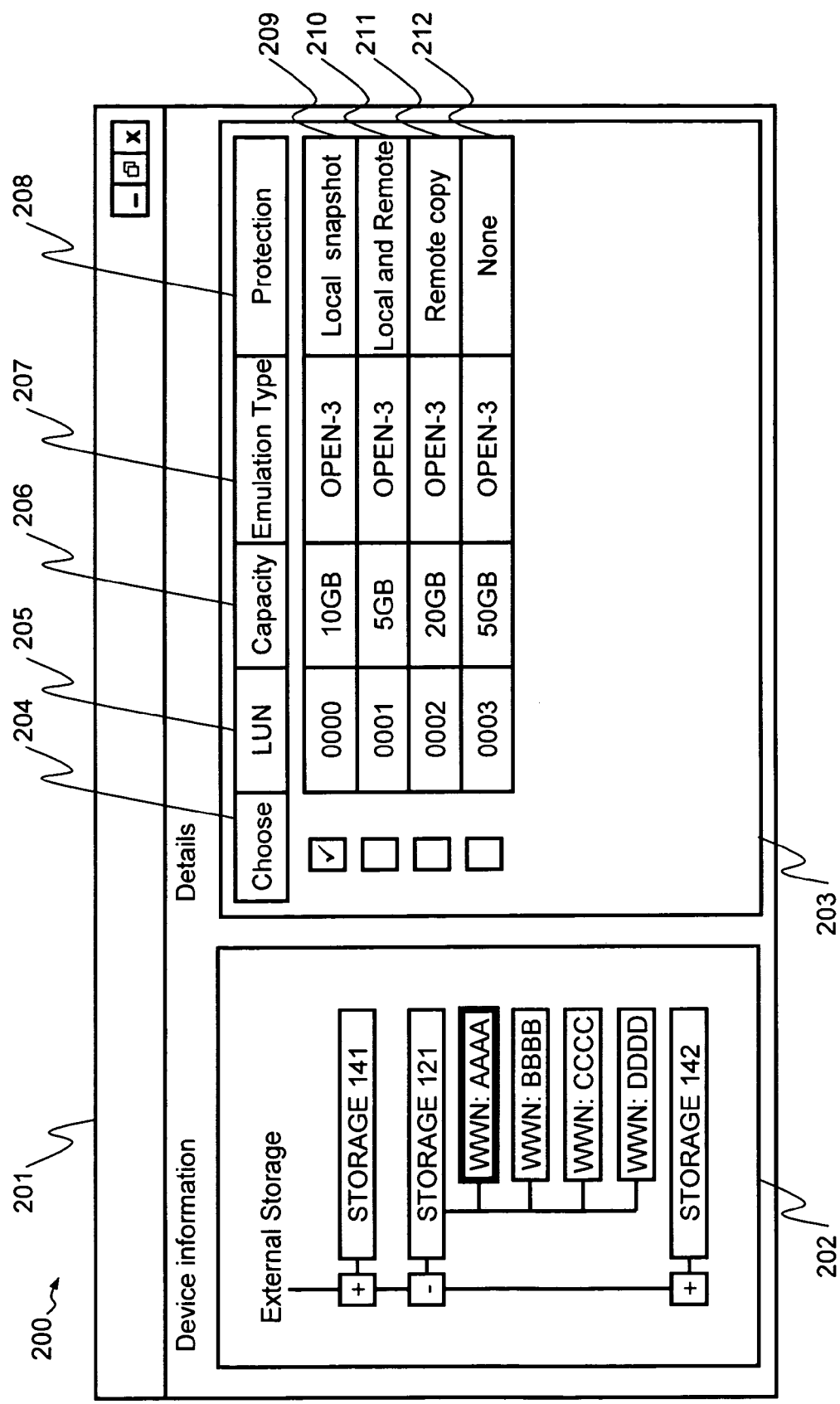
FIG. 2 illustrates an exemplary graphic user interface for use in mapping a real volume to a virtual volume.

The mapping of primary volume 123 to the virtual volume 110 is performed from the virtualization management terminal 112. FIG. 2 illustrates an example of a graphic user interface (GUI) 200 that may be used for the mapping. As an example, assume that the application computer 111 desires to use a volume whose size is 10 GB, and that a virtualization administrator will use the GUI 200 to configure the virtual volume 110 to be such a volume. The administrator using the GUI 200 opens a window 201 for configuring the virtual volume 110, it being understood that the window 201 illustrated is only an example, and the actual appearance and arrangement of window 201 may vary substantially.

In the window 201 illustrated, a first pane 202 is a pane which displays all of the storage systems able to couple to virtualization apparatus 101 via the external interface 109. In the first pane 202, the three storage systems 121, 141, and 142 which are illustrated in FIG. 1 as being in communication with virtualization apparatus 101 are shown. First pane 202 also illustrates that storage system 121 has several interfaces (e.g., ports in this example) whose WWNs (world wide names) are as shown (actual WWNs are typically longer than shown, but the shortened names are being used here for convenience of illustration). In this example, WWNs AAAA, BBBB, CCCC and DDDD correspond to interfaces 126, 131, 132, and 133, respectively, on storage system 121. Thus, a list of available interfaces is provided by the GUI 200 to the administrator for selection when setting up the virtual volume 110. When one of the interfaces, for example interface 126 (corresponding to WWN AMA), is selected, detailed information related to this interface is retrieved via interface 109 and interface 126.

A second pane 203 illustrated as part of window 201 is a pane which displays detailed information regarding the LUs (logical units) on the selected storage system 121 that a selected interface is able to handle. In this example, the administrator selects WWN AAAA as the interface to be used. Second pane 203 displays the LUs available to be accessed in storage system 121 via this interface. In the example, four LUs 209, 210, 211, 212 are displayed as being available, with each LU being identified by its LUN (logical unit number) 205, capacity 206, emulation type 207 and protection mechanism 208. Protection mechanism or scheme 208 indicates how the LU is protected, such as by local mirroring in the storage system, having a periodic local snapshot taken in the storage system, or by remote copying of data in the volume to another storage system. Because the LU with LUN 0000 has a capacity of 10 GB which is the size that the application computer 111 desires, this LU is chosen by the virtualization administrator, such as by using a check box 204, and is mapped to the virtual volume 110.

This mapping information of how the logical volume 123 in the storage system maps to the virtual volume 110 in the virtualization apparatus is stored in the mapping table 105. FIG. 3 illustrates an example of the virtual volume mapping table 105 that includes entries 307 and 308. Entry 307 applies to the example discussed above, and includes the local WWN 301 which in the illustrated example of FIG. 1 is the interface 107 used by the computer 111, and local LUN 302 is the LUN provided to the computer 111, by which the computer accesses virtual volume 110. Fields 303, 304, 305 and 306 relate to the information of the storage system 121 that maps to virtual volume 110. These include the storage system name 303 on the network, WWN 304 of the interface 126 on storage system 121, the LUN 304 on storage system 121 that serves as the primary volume 123, (which in this example is given LUN "0000") and the capacity 306 of the primary volume 123 (LUN 0000), which is 10 GB in this example. As indicated by the entry 308, any number of other virtual volumes may be created on virtualization apparatus 101, limited typically by the size of memory 114 and communication capacity (i.e., number of interfaces, number of processors, number of paths, etc.) Further, while both examples are illustrated as being mapped to the same storage system 121, it should be noted that the one virtual volume may map to one storage system 121, 141, 142, while another virtual volume may map to a different storage system 121, 141, 142.

When mapping a real primary volume to a virtual volume, the virtualization administrator is able to choose the protection mechanism as illustrated in column 208 of GUI 200 of FIG. 2. In some cases, the primary logical volume may not be protected at all, while in other cases, the data of the primary logical volume uses a protection technique, such as copying data to a secondary volume. When one of the protection mechanisms is chosen, the virtualization management terminal 112 is able to use the recovery table 106 to recognize and identify the secondary volume to which the primary volume is being copied.

FIG. 4 illustrates recovery table 106 having two entries 409, 410. Entry 409 is applicable to the example discussed above, and includes the storage system name 401 of the source LU, the WWN 402 of the source LU, the LUN 403 of the source LU, and the capacity 404 of the source LU. For the example of the volume 123 (whose LUN is 0000), the data in the volume 123 is copied to a target secondary volume, whose target LUN 407 is 0005, whose target storage system name 405 is storage system 121, whose target WWN 406 is AMA, and whose target capacity 408 is 10 GB. Thus, for entry 409, the source volume (volume 123 whose LUN is 0000) in the storage system 121 is copied to the target secondary volume (whose LUN is 0005) as a local snapshot or local mirror. Because it is a local copy, WWW 406 does not have to be specified for the purpose of the protection; however, the WWN is required later to establish a path to the port with the WWW when recovery takes place. Recovery table 106 is used by virtualization apparatus 101 to determine the path of a volume to which to fail over to when primary volume 123 fails. The commands to select the protection mechanisms are able to be transmitted over network 144 that connects the virtualization apparatus 101 and the storage system 121. The failover process and protection setup process will be described additionally below.

I/O Operations

Input/output (I/O) operations in the arrangement of FIG. 1 will now be described. When the virtualization apparatus 101 receives an I/O request from application computer 111 directed to virtual volume 110, virtualization controller 102 checks mapping table 105 to determine which real volume the virtual volume 101 represents, which is the primary volume 123 in this case. Then, the virtualization controller 102 forwards the I/O operation to the volume 123 in the storage controller 121 via the network 144 between the external interface 109 and the interface 126. The storage system 121 processes the I/O operation, returns the result to the virtualization apparatus 101, and the virtualization apparatus 101 returns the result to the application computer 111.

In particular, if the I/O operation is a read request and the requested data on a corresponding address resides on the cache 104 in virtualization apparatus 101, the virtualization controller 102 locates the data on cache 104 and returns the requested data to the application computer 111 so as to eliminate any communication time to the storage system 121. On the other hand, if the requested data is not currently stored in the cache 104, the data is retrieved from the real volume 123 via a request sent from the virtualization controller 102 to the storage controller 122. The storage controller 122 receives the read request, retrieves the data from the primary volume 123, and returns the requested data to the virtualization apparatus 101. The data is stored on the cache 104 and sent to the application computer 111 by the virtualization controller 102. The data may remain stored on the cache 104 for a period of time, depending on the particular cache flushing method used, so that the data can be used by the application computer 111 later. Further, storage controller 122 may also include a cache in memory 136, and this also is able to temporarily store data, thereby saving the time required for having to read data from the storage media 130 for some I/O operations.

Alternatively, if the I/O operation is a write request, the data is initially stored on cache 104 in virtualization apparatus 101, and then the data is sent by virtualization controller 102 to storage controller 122 for storage onto the primary volume 123. Thus, when the write request is written from the virtualization apparatus 101 to the volume 123 on storage system 121, there are two basic modes typically used for writing the data—synchronous mode and asynchronous mode. Asynchronous mode can further be divided into consistent asynchronous mode and inconsistent asynchronous mode.

If the synchronous mode is being used, when the virtualization apparatus 101 receives the write request from the application computer 111, the virtual apparatus 101 stores the data in the cache 104 and writes the data to storage system 121 for storage in the primary volume 123. When the data for the write operation has been received and stored, the storage system 121 sends a response to the virtualization apparatus 101 acknowledging receipt and storage of the data. When the virtualization apparatus receives the response from the storage system 121, the virtualization apparatus returns a response to the application computer 111 acknowledging storage of the write data so that the application computer can then send another I/O operation.

In the asynchronous mode, when the virtual apparatus 101 receives the write request and data from the application computer 111, the virtualization apparatus 101 returns a response to the application computer 111 without waiting for the write response from the storage system 121. The data can then subsequently be written to storage system 121 for storage on the primary volume 123. If write requests are sent for storage to the volume 123 in the order of the write sequence in which they were originally written by the application computer 111, data consistency is maintained (called consistent asynchronous mode hereafter), whereas if the sequence of write requests transferred to the primary volume 123 is different from the sequence of the write requests made by the application computer 111 to the virtualization apparatus 101, the data may not be consistent if the write request transfers should suddenly stop (inconsistent asynchronous mode).

If the data is transmitted in consistent asynchronous mode, some type of applications, such as a RDBMS (relational database management system), can resume their operation using the data on the volume 123 even if the data transmission from the virtual apparatus 101 to the volume 123 suddenly stops. However, even in inconsistent asynchronous mode, if the application periodically stops the I/O processes at particular points in time when the virtualization apparatus 101 flushes the recent write operations to the volume 123, the data on the volume 123 is able to maintain consistency at those particular points in time.

Figure 5:
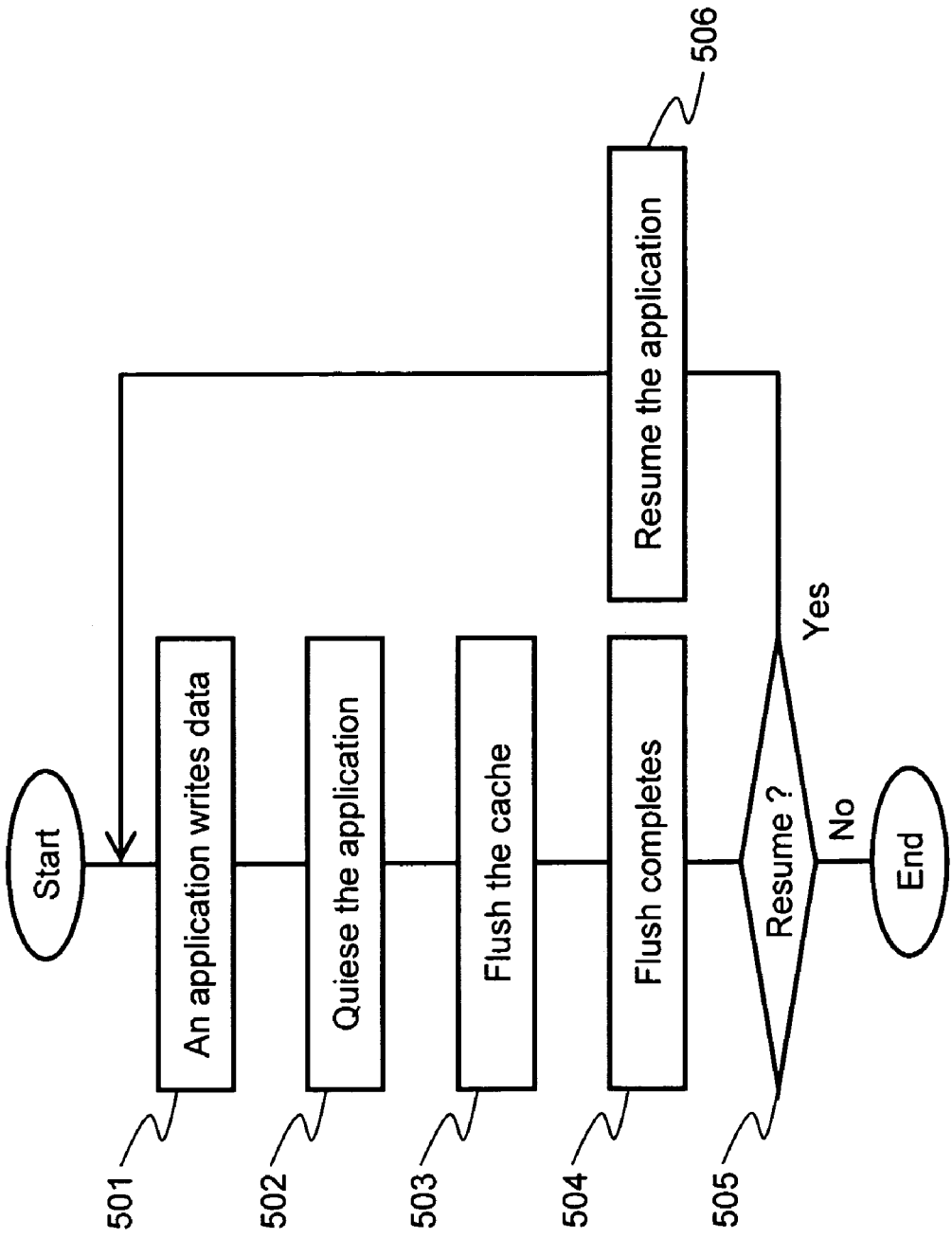
FIG. 5 illustrates an exemplary process flow for flushing the cache.

FIG. 5 an exemplary process flow for storing data using inconsistent asynchronous mode along with making the application dormant temporarily while the flush of the cache 104 takes place.

At step 501, the application computer 111 is writing data on the virtual volume 110 by sending the data to the virtualization apparatus 101. The data is stored in cache 104, and the data is asynchronously transmitted to the volume 123.

At step 502, the application computer 111 stops (i.e., is made quiescent or goes dormant) at a point in time when the data written on the virtual volume 110 is consistent.

At step 503, the application computer 111 instructs the virtualization apparatus 101 to flush the virtual volume 110. The controller 102 on virtualization apparatus 101 writes data not yet written from the cache 104 to the primary volume 123.

At step 504, the flush operation by the virtual apparatus 101 completes when the controller 102 receives a response from the storage controller 122 acknowledging receipt of the last write operation flushed from the cache 104.

At step 505, the virtualization apparatus sends a notice of completion of cache flush to the application computer 110, and a determination is made whether to resume the application.

At step 506, the application resumes if the result of the determination was affirmative, or the flow ends if the result of the determination was negative.

The data is consistent for the period just after the step 504 until the next data is written to virtual volume 110 after the step 506. During this period, it is possible under the invention to save this consistent image using protection mechanisms as described below.

Data Protection

Now that basic data storage techniques have been described, data protection will be described next. Types of data protection used with the invention include local copy and remote copy. Under local copy, the data on primary volume 123 may be copied to another volume in the same storage system 121 such as a local secondary volume 124, which is referred to as a local snapshot or local mirror, depending on the technique used. If the data from primary volume 123 is copied to secondary volume 124 as it is received by primary volume 123, then secondary volume 124 represents a mirror of the data stored on primary volume 123, and these two volume form a replication pair. Alternatively, if the data is copied from the primary volume 123 to the secondary volume 124 only at a certain point in time, then secondary volume 124 is typically referred to as a snapshot since it represents the data stored in the primary volume 123 at a particular point in time when the copy was made. Under a combination of these techniques, a mirror may periodically be broken off to create a snapshot and then resynchronized with the primary volume when the snapshot copy is complete. The timing of taking snapshots has been the subject of a large amount of prior art. Thus, a local snapshot may be taken once a day, such as at night while the application is not working. Alternatively, the storage system 121 may create several generations of snapshots from primary volume 123, such as once every hour, to enable greater granularity for recovery at a particular point in time. Numerous other permutations of remote copy techniques may be used with the invention, with it being understood that those described above, are basic techniques.

Figure 6A:
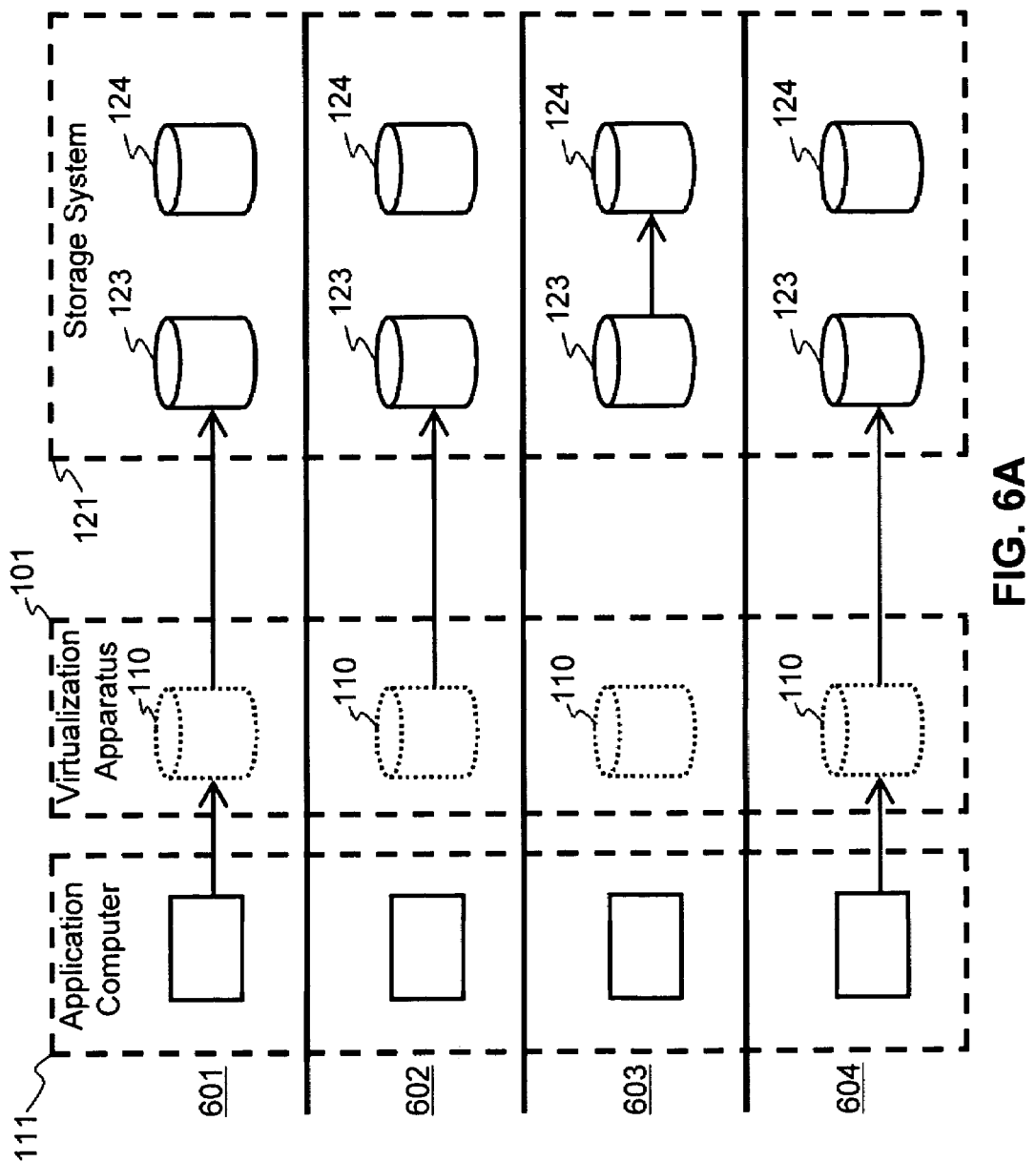
FIG. 6A illustrates steps for I/O operations with a local copy.

FIG. 6A illustrates an example of producing a local copy under the arrangement of FIG. 1. The application computer 111 writes data to the virtual volume 110, as described above. The write data is forwarded from the virtualization apparatus 101 to the storage system 121, and written on the volume 123, as also described above. The data on the primary volume 123 is copied to the volume 124 as a local mirror or snapshot.

At step 601, the application computer 111 writes data to virtual volume 110, and the data is transmitted by the virtualization apparatus 101 to the storage system 121 for storage in primary volume 123.

At step 602, the application computer 111 completes the I/O operation. If the data transmission between the virtualization apparatus and the storage system 121 is asynchronous, the data may still be in the process of being transmitted to the primary volume 123.

At step 603, when the data transmission from the cache 104 to the volume 123 completes, the data on the primary volume 123 is copied to the local secondary volume 124. This data may actually be copied from the cache in memory 136 of storage system 121 shortly after storage of the data to primary volume 123 is complete, or the data may be read back out from primary volume 123 at a later time.

At step 604, while the copy from primary volume 123 to local secondary volume 124 completes, the application computer 111 may conduct additional I/O operations and data is written to virtual volume 110, which is the same state that of step 601.

Figure 8:
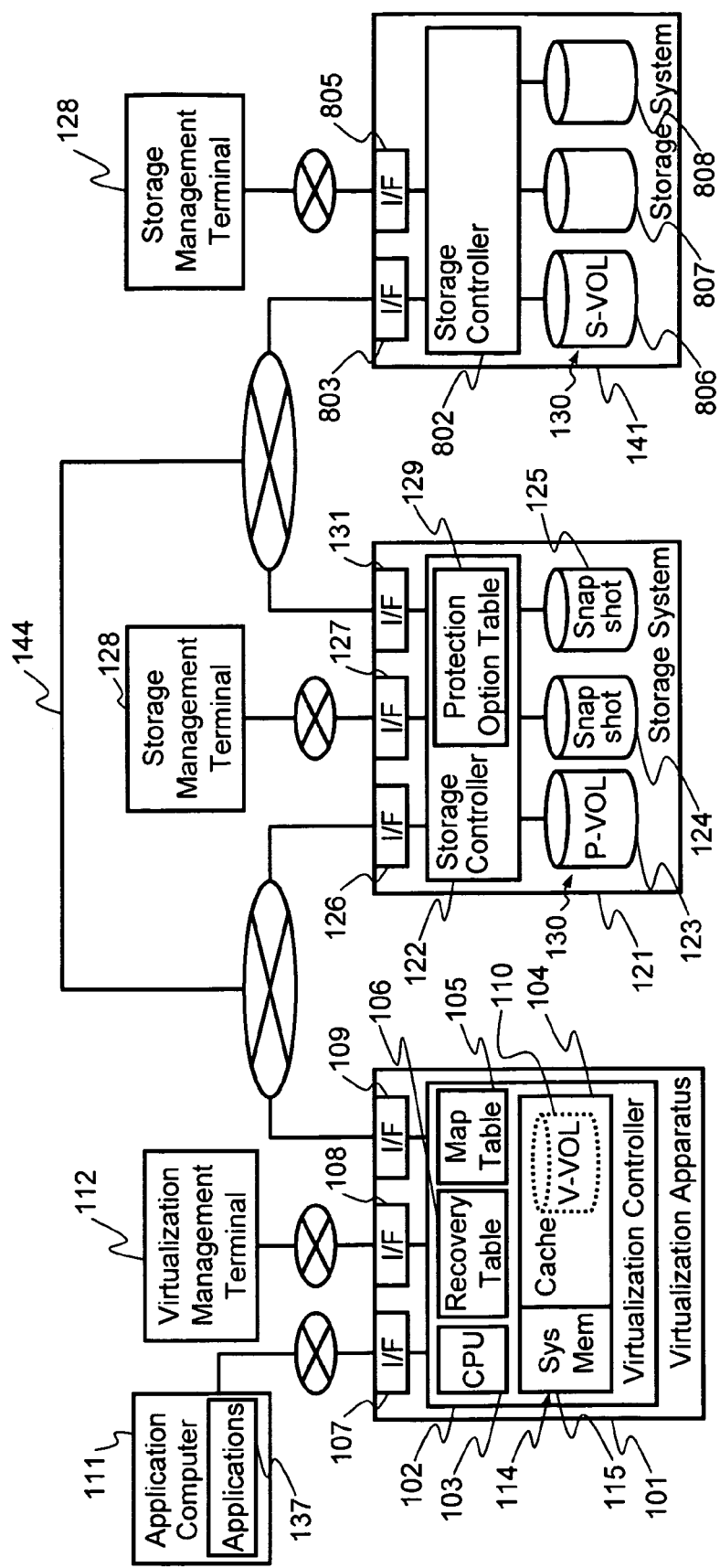
FIG. 8 illustrates an exemplary system in which data on the primary volume is copied to local volumes and a remote secondary volume in another storage system.

In addition to or instead of the local copy described above, the data stored in primary volume 123 may be copied to a volume located in another storage system, such as one located remotely from storage system 121. FIG. 8 illustrates an example in which storage system 141 is used for storing a secondary volume 806 that is a remote copy of primary volume 123, so that these volumes make up a replication pair. Storage system 141 includes a controller 802 and volumes 806, 807, 808 allocated storage space on storage media 130.

Figure 6B:
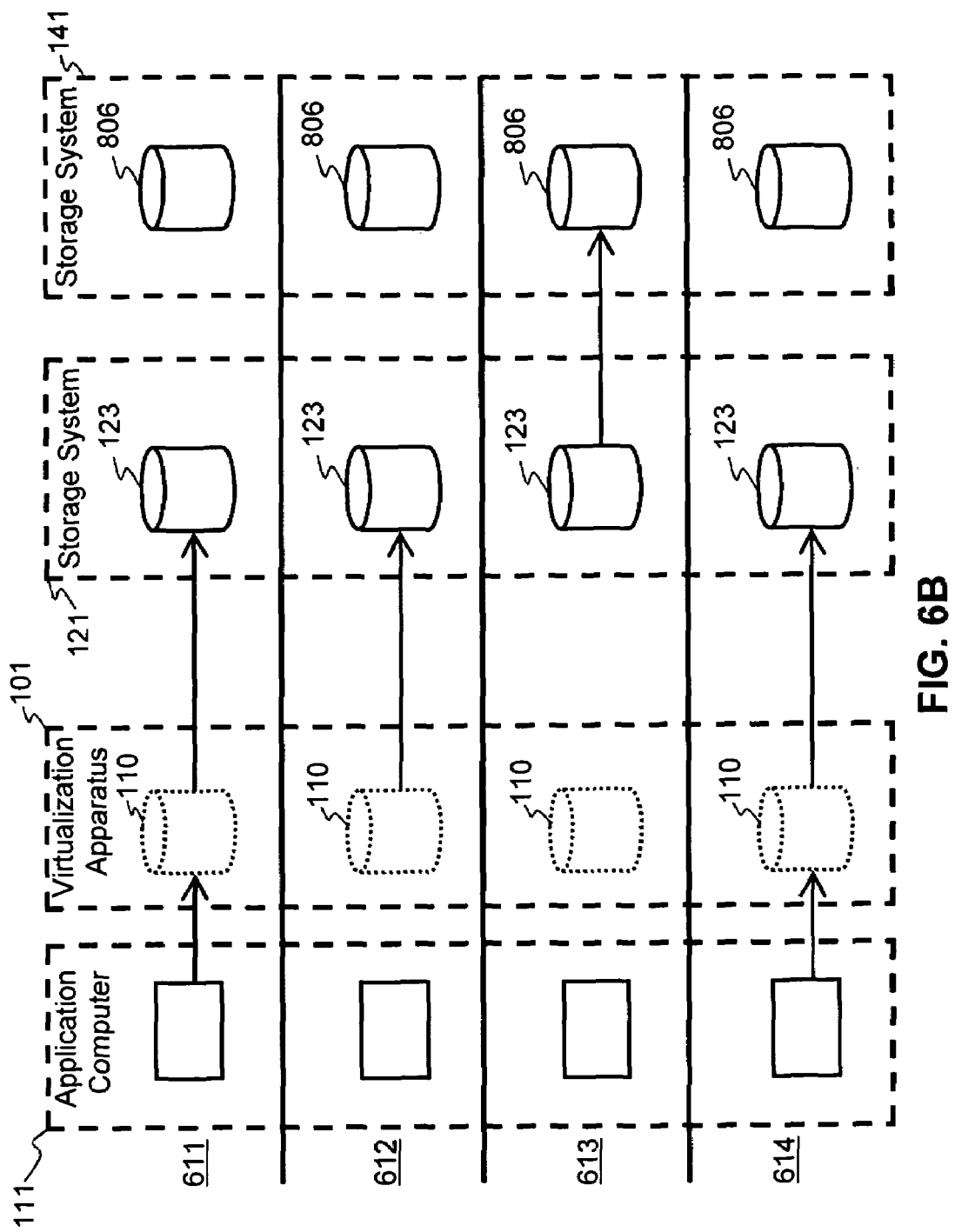
FIG. 6B illustrates steps for I/O operations with a remote copy.

A storage management terminal 128 may also be included for communicating with storage system 141 via an interface 805. The data targeted for storage to virtual volume 110 is actually stored on the volume 123 in the storage system 121. Storage system 141 is connected via an interface 803 through the network 144 using a protocol, such as FC. The data written on primary volume 123 is copied to the secondary volume 806 in storage system 141 using a remote copy technique. There are many prior art methods for remote copy, and the invention is not limited to any particular method. In the example discussed below, volume 608 is the remote secondary volume and the remote copy may be performed in the manner illustrated in FIG. 6B.

At step 611, the application computer 111 writes data to virtual volume 110, and the data is transmitted by the virtualization apparatus 101 to the storage system 121 for storage in primary volume 123.

At step 612, the application computer 111 completes the I/O operation. If the data transmission between the virtualization apparatus and the storage system 121 is asynchronous, the data may still be in the process of being transmitted to the primary volume 123.

At step 613, when the data transmission from the cache 104 to the volume 123 completes, the data on the primary volume 123 is copied to the remote secondary volume 806. This data may actually be copied from the cache in memory 136 of storage system 121 shortly after storage of the data to primary volume 123 is complete, or the data may be read back out from primary volume 123 at a later time.

At step 614, while the copy from the primary volume 123 to the remote secondary volume 806 completes, the application computer 111 may conduct additional I/O operations and data is written to the volume 110, which is the same state as that of step 611.

The foregoing local and remote copy processes may be carried out synchronously or asynchronously between the primary volume and the secondary volume. Under synchronous mode, when the application computer 111 writes data to the virtualization apparatus 101, the virtualization apparatus writes the data to the storage system 121 for storage on the primary volume 123. The storage system 121 then writes the data to the local secondary volume 124 (and/or remote secondary volume 806). When this operation is complete, the storage system sends back acknowledgement of completion to the virtualization apparatus, which in turn sends back acknowledgement of completion to the application computer 111. However, as the synchronous mode can cause slowdown in application processing, asynchronous mode can be used in which, as discussed above, the virtualization apparatus sends back an acknowledgement response as soon as the data is stored in cache 104, and the data is subsequently stored to the primary and secondary volumes in an asynchronous fashion.

Recovery

When the storage system 121 indicates errors in writing data on the primary volume 123, the virtualization apparatus 101 may need to change the path from the primary volume 123 to a secondary volume to which the data on primary volume 123 has been copied. As is already described above, the recovery table 106 maintains paths to one or more alternative volumes to which the virtualization apparatus 101 is supposed to switch to upon failover. Thus, when failover becomes necessary, the virtualization apparatus 101 may be programmed to automatically switch the path from the primary volume 123 to a secondary volume such as local secondary volume 124 or remote secondary volume 806 discussed above.

However in some cases, it may be appropriate for a human operator to choose which volume to use as the alternative (failover-to) volume. In this scenario, the recovery table 106 is not necessarily maintained in the virtualization controller 102 for the purpose of the recovery. When an error occurs in writing data on the primary volume 123, the administrator is notified and able to select the alternative volume by using the management terminal 112.

Under one possible embodiment for the configuration illustrated in FIG. 8, volumes 124 and 125 are local snapshot copies of primary volume 123, and primary volume 123 is also remotely copied to remote secondary volume (S-VOL) 806. When the administrator chooses which volume to use as the alternative of primary volume 123, the management terminal 112 displays to the administrator the list of the candidates of the alternatives in a manner such as illustrated in FIG. 7. FIG. 7 illustrates the list of the alternative volumes in an alternative volume table 700, wherein entries 706 and 707 correspond to local snapshot volumes 124 and 125, respectively, and entry 708 corresponds to the remote secondary volume 806. Column 701 shows the name of the storage system, column 702 shows the WWN, column 703 shows the LUN, column 704 shows the protection type, and column 705 illustrates how old the data is inside each volume. For example, the cell 709 of entry 706 shows that the snapshot was taken 10 minutes before. Additionally, if the entire storage system 121 is not available, then entries 706 and 707 will not be shown, and thus, only entry 708 would be displayed to the administrator. The administrator is able to choose one of the alternative volumes to resume the application. Alternatively, virtualization apparatus 101 can be programmed to automatically switch paths to one of the alternative volumes according to a predetermined hierarchy. For example, the path may be switched to the volume shown in the alternative volume table that is shown as being the least old in status column 706.

When errors in reading or writing to primary volume 123 are detected, the processing of the application computer 111 should be stopped or suspended. Then after determining the alternative volume to fail over to, either manually or automatically, as described above, the application computer 111 is able to resume processing of applications 137. However, if the cache 104 retains all of the data records which have not yet been copied from the primary volume to the secondary volume, the application computer 111 does not have to stop processing of applications 137. Under this method, after determining the volume to fail over to, the virtualization apparatus 101 establishes the path to the alternative volume, and resumes writing of data targeted to virtual volume 110 to the alternative volume.

In order to enable this failover without having to stop the processing of application computer 111, virtualization apparatus 101 adds sequence numbers to each of the write operations to virtual volume 110, and these sequence numbers are forwarded with their corresponding write operation to primary volume 123. As storage system 121 completes copying of each write operation to the secondary volume (either local, remote, or both), the storage system sends this latest sequence number back to the virtualization apparatus 101. As the virtualization apparatus 101 receives the latest sequence number, the virtualization apparatus 101 may delete the write data from the cache 104, and is thus able to determine which data has not yet been stored in the secondary volume. Accordingly, when failover to the secondary volume occurs, the virtualization apparatus is able to immediately begin writing data to the secondary volume, beginning with the data still retained with the oldest sequence number. In such a situation, there may be no stopping required of the processing of the application computer, since the only delay is in the time necessary to determine the path of the alternative volume and then switch the path.

However, in the case in which the virtualization apparatus 101 cannot retain all of the records that have not yet been copied from the primary volume to the secondary volume, such as due to a small cache 104, then application computer 111 must stop operation when primary volume 123 or storage system 121 fails.

Figure 10A:
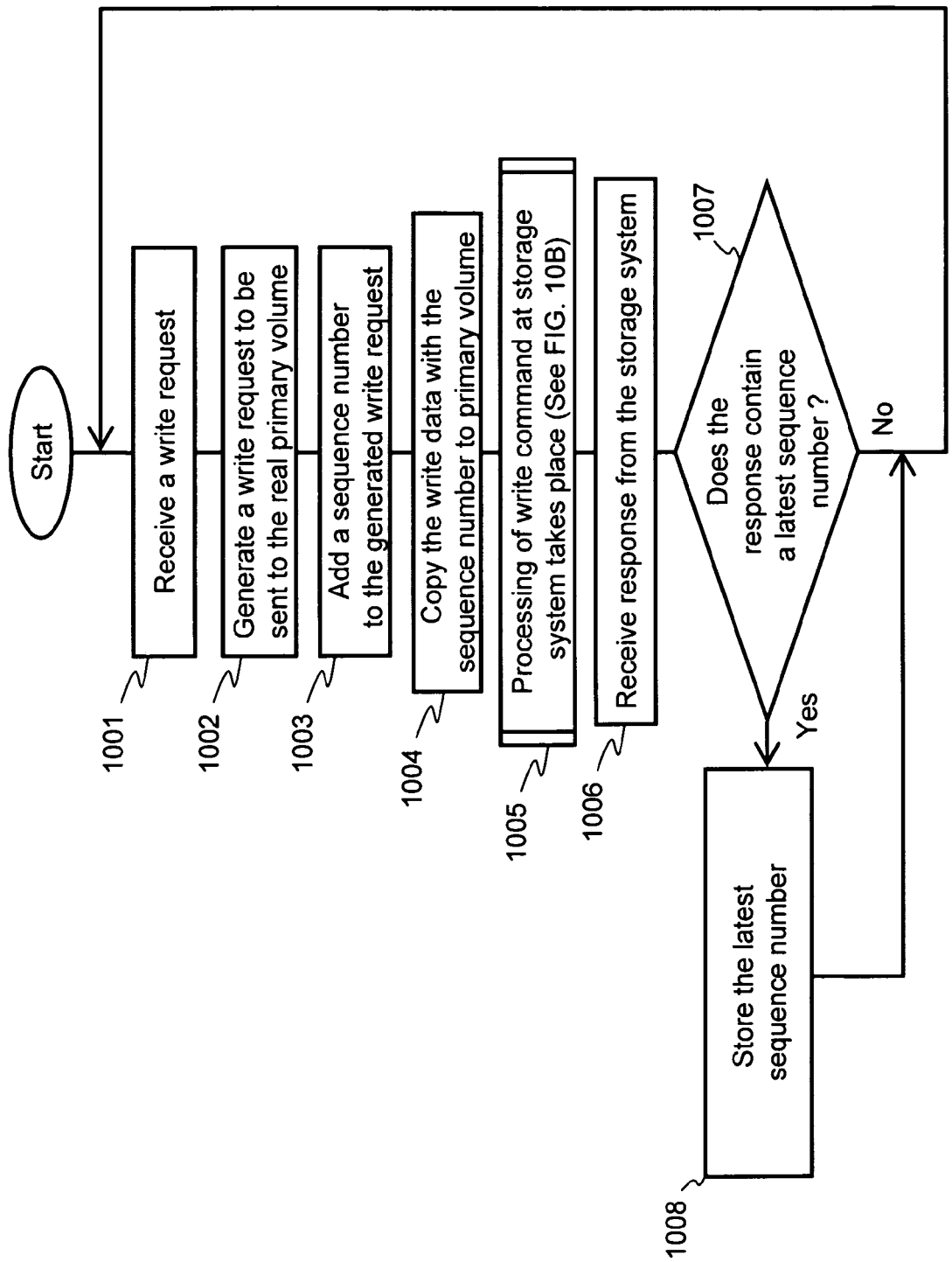
FIG. 10A illustrates a process flow for receiving a write command at the virtualization apparatus.

FIG. 10A illustrates a process flow of how the virtualization apparatus 101 processes write requests and adds sequence numbers to the write requests to enable failover to a secondary volume while determining whether processing of the application computer needs to be stopped.

At step 1001, the virtualization apparatus 101 receives a write request directed to the virtual volume 110 from the application computer 111 and stores the write data into cache 104.

At step 1002, the virtualization apparatus 101 generates a write request for sending the write data to the real primary volume 123 using the write request received from the application computer 111 at step 1001.

At step 1003, the virtualization apparatus 101 generates a sequence number for the write request generated and includes this sequence information with the write request that is generated at step 1002, so that the storage system 121 will be able to understand the sequence number corresponding to the write record. The sequence number is stored in the cache associated with the write data.

At step 1004, the write data is copied from cache 104 with the write request and corresponding sequence number and these are sent to storage system 121.

Figure 10B:
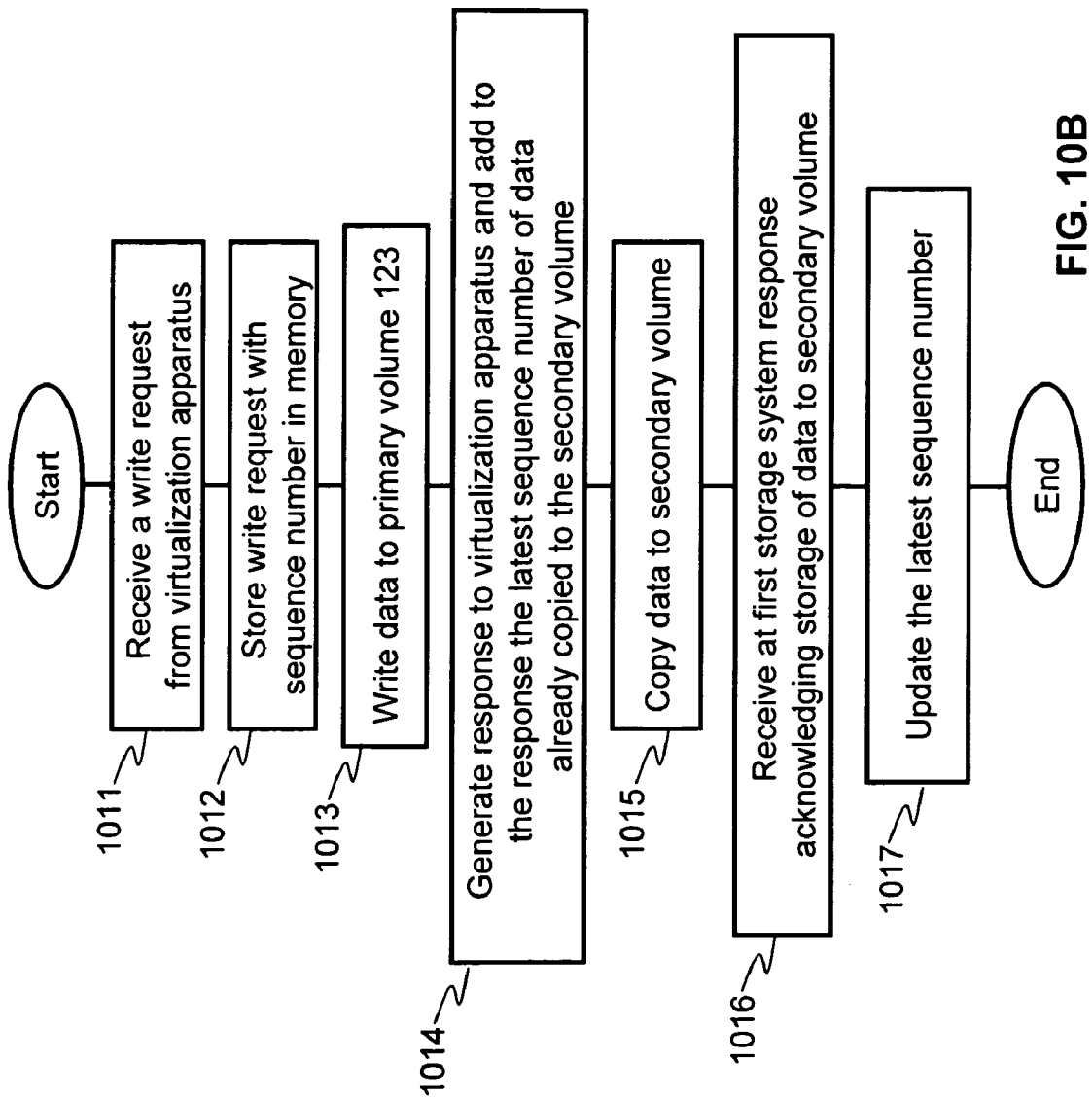
FIG. 10B illustrates a process flow for receiving a write command at the storage system having the primary volume.

At step 1005, processing takes place at the storage system, as illustrated in FIG. 10B. It should be noted that FIG. 10B illustrates one embodiment of a remote copy scheme that may be used with the invention, with it being understood that other mirroring and local and remote copy techniques may also be used with the invention.

At step 1011 (FIG. 10B), the storage system 121 receives the write request and sequence number corresponding to the write requests.

At step 1012, the storage system stores the write request with sequence number in memory.

At step 1013, the storage system 121 writes the data from the write request to primary volume 123.

At step 1014, the storage system 121 generates a response indicating that the current write request has been received and written to primary volume 123, and the storage system also includes a latest sequence number with the response. The latest sequence number means all of the records with sequence numbers equal to or less than this number have been copied to the secondary volume. Further, the response may be generated as soon as the write request is stored in memory, rather than in primary volume 123, depending on a chosen storage technology. Once the response from the storage system 121 is received by the virtualization apparatus 101, the process of FIG. 10A is able to continue, while the process of FIG. 10B also continues.

Returning to FIG. 10A, at step 1006, the virtualization apparatus 101 receives the response from the storage system 121 that the write operation is complete.

At step 1007, the virtualization apparatus 101 examines the response to see if a latest sequence number is also contained in the response. This latest sequence number means all of the records with the sequence number equal to or less than the last number have been successfully copied to the secondary volume.

At step 1008, if a latest sequence number is contained in the response, the latest sequence number is stored in memory by the virtualization controller 102, and optionally, the write records which have sequence numbers equal to or less than the latest sequence number can be deleted from cache 104. Steps 1001 through 1008 are repeated by virtualization apparatus 101 for each write operation received from application computer 111 until the process is explicitly terminated or an error occurs.

Returning to FIG. 10B, while the virtualization apparatus 101 is processing steps 1006 et seq. in FIG. 10A following receipt of the response, storage system 121 may simultaneously or asynchronously continue processing to step 1015, in which the data from the write request is copied to the secondary volume.

At step 1016, the storage system 121 receives acknowledgment of completion of copying of the data to the secondary volume. In the case of remote copy, this will be received from the remote storage system, e.g., storage system 141. In the case of local copy, the storage system 121 itself will know when copying is completed.

At step 1017, following completion of storage of the data to the secondary volume, the storage system 121 updates the latest sequence number stored in the memory of the storage system 121, if all of the records with sequence numbers smaller than the corresponding sequence number have been copied to the secondary volume and the process ends. Further, it should be noted that storage system 121 could be programmed to return the latest sequence numbers to virtualization apparatus 101 as they are updated, rather than having to wait for the next write operation received from the virtualization apparatus 101.

Figure 11:
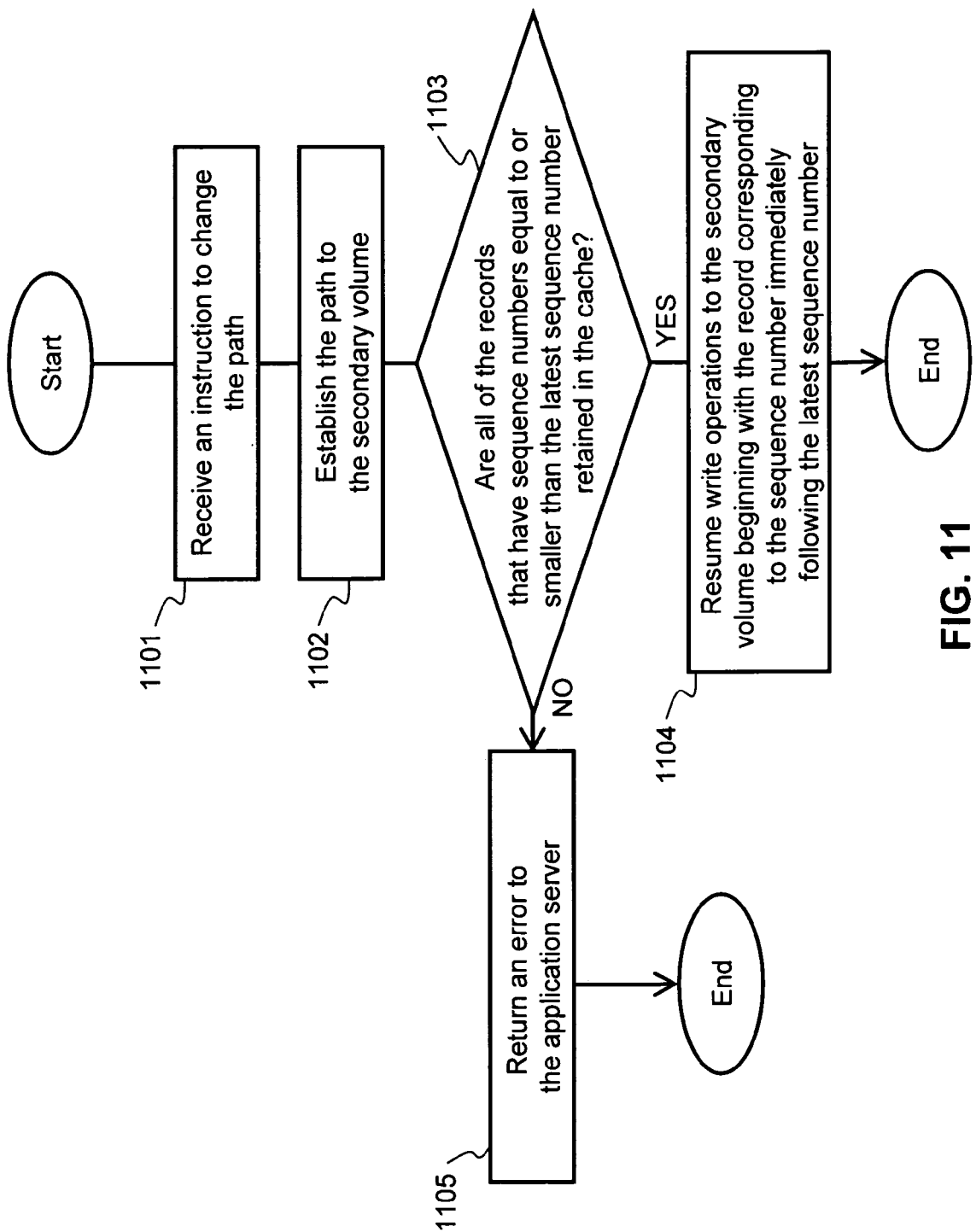
FIG. 11 illustrates a process flow carried out when I/O to the primary volume fails.

FIG. 11 illustrates the process flow that takes place in the virtualization apparatus 101 when I/O to primary volume 123 fails.

At step 1101, the virtual apparatus 101 receives an instruction to change the path from the volume 123 to the secondary volume such as remote secondary volume 806. This instruction may be automatically generated in the virtualization apparatus in response to an error message regarding writing data on the volume 123, or a human operator may initiate it by watching the write operations to the volume 123. As discussed above with respect to FIGS. 4 and 7 an appropriate secondary volume to which to change the path is determined either automatically, or by an administrator. In this example, secondary volume 806 has been chosen.

At step 1102, the virtualization apparatus 101 establishes the path to the secondary volume 806.

At step 1103, the virtualization apparatus 101 checks if all of the records which have the sequence numbers equal to or smaller than the latest number which is stored at the step of 1008 of FIG. 10A. up to the most recently written record received from the application computer 111 are retained in the cache.

At step 1104, if the answer to step 1103 is yes, the virtualization apparatus 101 can continue the processing without stopping processing of application computer 111. Accordingly, virtualization apparatus 101 resumes write operations to the secondary volume 806 beginning with the write record that corresponds to the sequence number that immediately follows the latest sequence number stored at step 1008 of FIG. 10A. This write process is the same as described in FIG. 10A, except that the write records are stored to the secondary volume 806 instead of primary volume 123. FIG. 10B generally would not apply unless a new secondary volume is set up for receiving a copy of data stored to original secondary volume 806.

At step 1105, if the answer to step 1103 is no, the virtualization apparatus 101 returns an error to the application computer 111 in the next read/write command response, which may cause the application computer 111 abort the process. When such an error occurs, data stored on the cache 104 needs to be cleared up before the application computer 111 restarts.

If the virtualization apparatus 101 is equipped with relatively larger cache, the probability of the occurrence of errors such as described in step 1105 decreases. To further increase the cache size, disk storage may be used in some applications as a part of the cache 104 instead of semiconductor-based cache memory in order to make the cache size larger and cheaper.

Further, depending on the technology used for the data protection, there may be remaining data which has been written on the primary volume 123, but which has not been copied to the secondary volume. (Although, in the case where synchronous remote copy is used, there is no such remaining data.) Furthermore, in some embodiments, the maximum amount of the data that will remain uncopied to the secondary volume can estimated based on certain performance assumptions of the storage systems being used. Thus, if no network failure occurs, then, based on metrics such as write request pattern, network throughput, disk write speeds, and the like, increasing the size of the cache 104 by an estimated maximum amount of the remaining data will make the possibility of such error occurrence virtually zero.

The flows described in the FIGS. 10 and 11 are based upon the storage system 121 that hosts the primary volume 123 returning the latest sequence numbers in response to subsequent write requests to primary volume 123. However, in another embodiment the storage system 121 does not necessarily return the latest sequence numbers, and the storage system which hosts the secondary volume provides the virtualization apparatus 101 with the latest sequence number directly as the data is successfully stored to the secondary volume or on failover. For example, referring to FIG. 8, through the network 144 connection between the interfaces 109 and 803, the virtualization apparatus 101 may issue control commands, such as for retrieving the latest sequence numbers, in addition to normal I/O commands.

Figure 12:
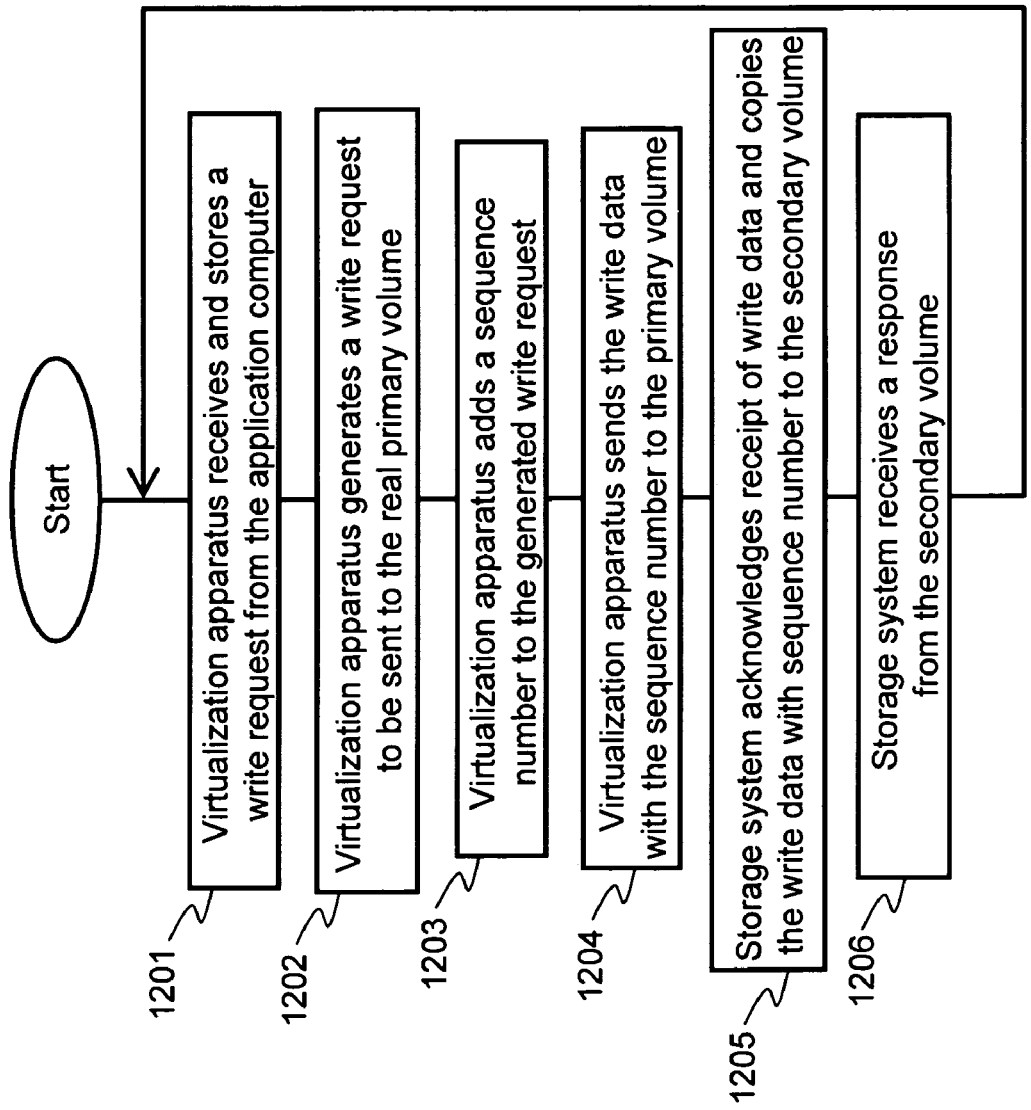
FIG. 12 illustrates a process flow of when the storage system that hosts the secondary volume provides the virtualization apparatus with the sequence number.

FIG. 12 illustrates the processing of write requests in the virtualization apparatus 101 for this embodiment, and is explained using the configuration of FIG. 8.

At step 1201, the virtualization apparatus 101 receives a write request from the application computer 111 stores the write data in cache 104.

At step 1202, the virtualization apparatus 101 generates a write request to be sent to the primary volume 123.

At step 1203, the virtualization apparatus 101 generates a sequence number corresponding to the write data stored in the cache 104, stores the sequence number in the cache in association with the write data, and includes the sequence number in the write request.

At step 1204, the virtualization apparatus 101 sends the write data with the write request and corresponding sequence number to the primary volume 123 in storage system 121.

At step 1205, the storage system 121 receives the write request, stores the data to primary volume 123 and returns a response to the virtualization apparatus acknowledging storage of the write request to primary volume 123. Storage system 121 also copies the write data to the secondary volume. Assuming the secondary volume is remote volume 806 in storage system 141, this involves sending the write data and corresponding sequence number to storage system 141.

At step 1206, storage system 121 receives a response from storage system 141 acknowledging storage of the write data in remote secondary volume 806. Storage system 141 has also stored the corresponding sequence number and calculates the latest sequence number. Further, it should be noted that unlike FIG. 10A, the virtualization apparatus 101 does not receive or store the latest sequence number at steps 1205 and 1206. Instead, this remains stored in the storage system that hosts the secondary volume, such as second storage system 141.

Figure 13:
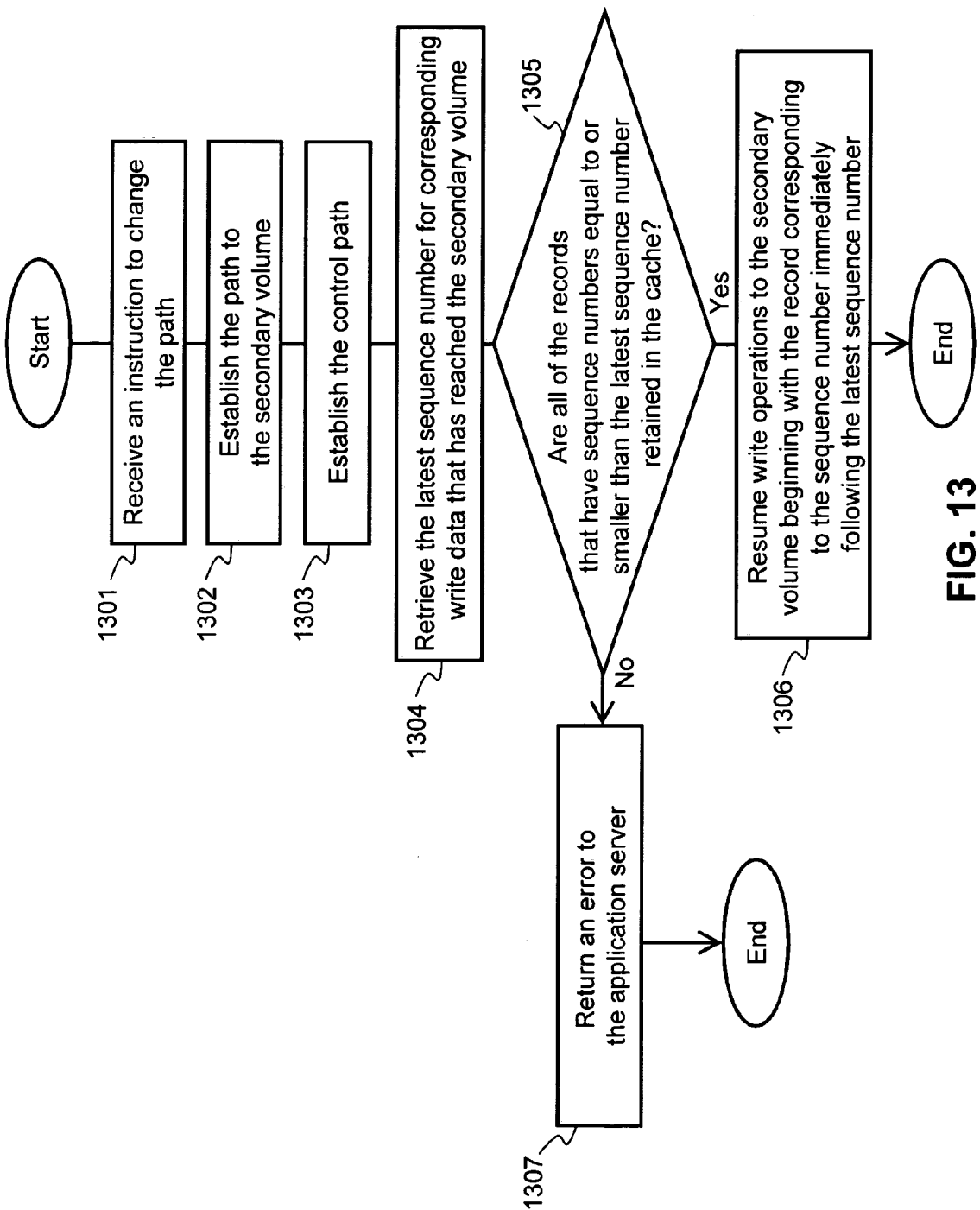
FIG. 13 illustrates a process flow carried out when I/O to the primary volume fails and the storage system that hosts the secondary volume provides the virtualization apparatus with the sequence number.

FIG. 13 illustrates an exemplary process that is carried when primary volume 123 fails in the embodiment of FIG. 12, and is explained using the configuration in FIG. 8, i.e., primary volume 123 is copied to remote secondary volume 806.

At step 1301, the virtualization apparatus 101 receives an instruction to change the path, like step 1101 discussed above.

At step 1302, the virtualization apparatus 101 establishes the path to the secondary volume 806 via the interfaces 109 and 803, like step 1102 discussed above.

At step 1303, the virtualization apparatus 101 establishes a control path to retrieve the latest sequence number that has been stored by the storage system 141 for corresponding write records that have been stored to volume 806. The connection used can be shared with I/O commands over network 144, for example.

At step 1304, virtualization apparatus 101 retrieves from the secondary storage system 141 the latest sequence number for write data that has been stored to the secondary volume 806. This latest sequence number indicates that all of the write records from primary volume 123 with sequence numbers less than or equal to the latest sequence number have already been stored to the secondary volume 806. When the copy technology used for copying data from primary volume 123 to the secondary volume 806 is not synchronous remote copy (i.e., a kind of remote copy technology in which a response to the I/O command issued from a host is returned when the primary storage system receives an acknowledgement of data copy from the secondary storage system), the largest sequence number that has reached secondary volume 803 is not necessarily the latest sequence number. This can occur when the technology to copy data from the primary volume to the secondary volume is asynchronous remote copy (i.e., a kind of remote copy technology in which a response to the I/O command issued from a host is returned by the primary storage system without waiting for the acknowledgement of receipt of remote copy data from the secondary storage system). In such a case, the latest sequence number is calculated as the number for which all of the records with sequence numbers equal to or less than this number have been copied to the secondary volume, even though there may also be larger sequence numbers that have been received by the secondary storage system as well.

At step 1305, the virtualization apparatus 101 checks if all of the records which have the sequence numbers equal to or smaller than the latest number are retained in the cache. If this is the case, the virtualization apparatus 101 can continue the processing without stopping the application computer 111.

At step 1306, if the answer to 1305 is affirmative, virtualization apparatus 101 resumes write operations to the secondary volume from the write records, beginning with the write record having a sequence number that immediately follows the latest sequence number received from the storage system that hosts the secondary volume.

At step 1307, if the answer to 1305 is negative, then virtualization apparatus 101 returns an error to the application computer 111 in the next read/write command response, which may cause the application computer 111 abort the process. When such an error occurs, data stored on the cache 104 needs to be cleared up before the application computer 111 restarts.

Management at Data Centers

Figure 9:
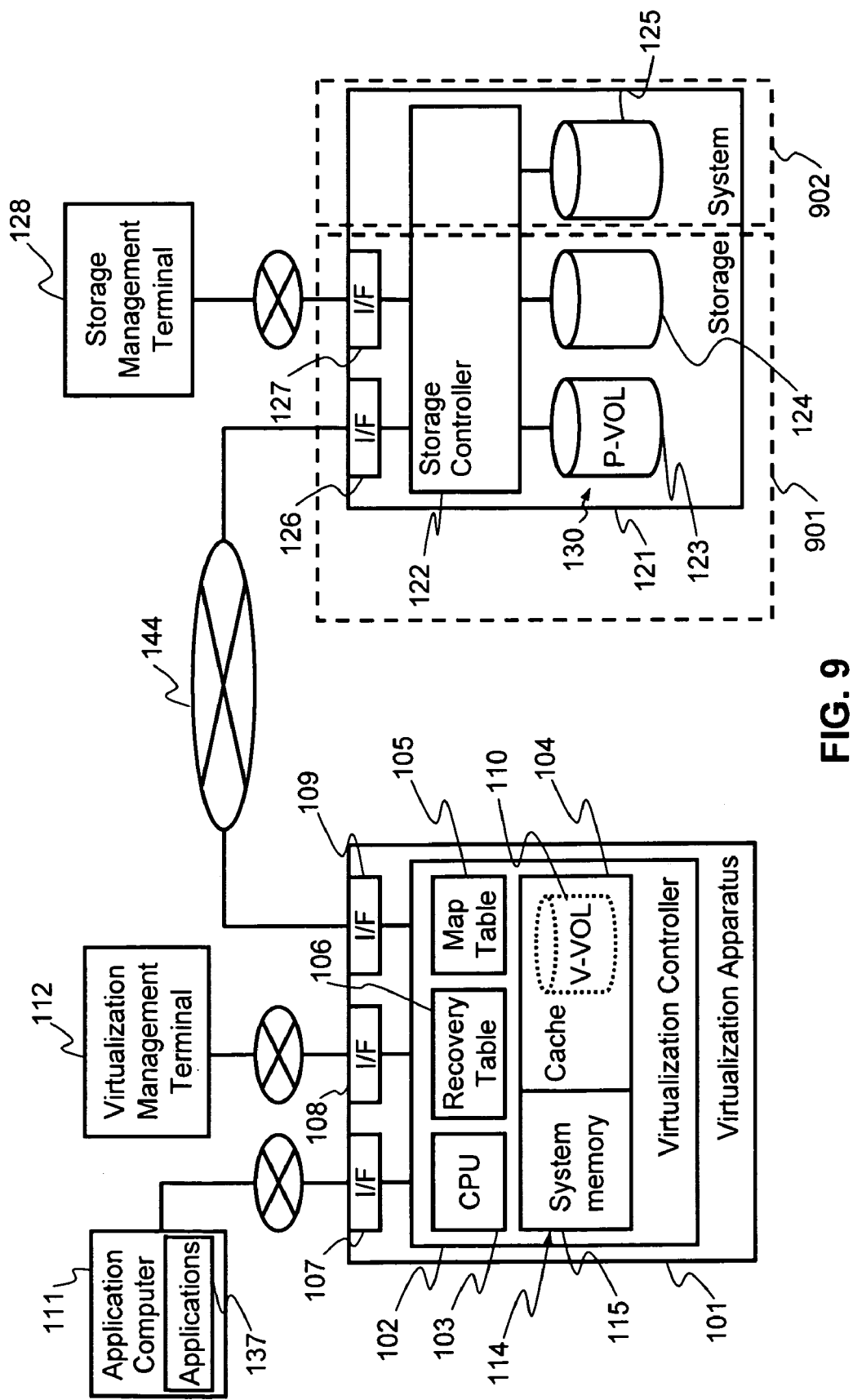
FIG. 9 illustrates use of a logical partition for each storage customer.

The storage systems 121, 141, 142 are each managed through their respective management terminals 128. As illustrated in FIG. 9, the storage administrator of a storage system may divide the entire storage system into logical partitions. In FIG. 9, storage system 121 is illustrated as being partitioned into two logical partitions 901 and 902. By dividing the storage system 121 into logical partitions, a particular virtualization apparatus is only able to see a portion of the storage system 121. Further, the partitioning of storage resources, such as disk space, memory, ports and processing capacity can enable efficient use of the storage resources. This partitioning may be done using known methods, such as network-based zoning or LUN masking which is an access control mechanism that limits an entity to accessing specific LUs. The partitioning is carried out by the storage administrator for the storage system, and thus, a user or administrator of the virtualization apparatus does not need to know or care if the storage system has been logically partitioned.

In addition, the storage administrator prepares the options for the protection mechanisms of volumes in the storage system and registers those options in the protection option table 129. Thus, protection option table 129 lists protection options available for each available volume (logical unit). The information contained in the protection table 129 is transferred to the virtualization apparatus 101 and is displayed in column 208 of GUI 200, as discussed above with respect to FIG. 2.

As described above, the protection mechanism of primary volume 123 is chosen by the administrator of the virtualization apparatus at the management terminal 112. When one of the protection mechanisms is chosen, storage system 121 receives an instruction that is sent from the virtualization management terminal 112 to either the storage system 121 or to the storage management terminal 128, such as via network 144. In the case in which the storage system 121 is able to automatically set up the copy protection configuration, the instruction indicates the chosen copy protection mechanism, and the storage system 121 receives the instruction and automatically sets up the copy protection accordingly. Alternatively, in the case in which a storage administrator at the storage management terminal 128 has to set up the configuration manually, the instruction is received by the storage administrator at management terminal 128 either directly, or via communication through storage system 121, and the storage administrator manually sets up the copy protection accordingly.

The technology of the invention is also suitable for SOHO (small office, home office) or remote office environments. Users of the invention install virtualization apparatus 101 in addition to their own application computer. Under the invention, the users, such as at SOHOs and remote office environments, do not have to manage a physical storage system, which includes things such as adding more hard disk drives to the storage system in case the storage capacity is running out, or the monitoring and managing of local and remote copy configurations. For example, setting up remote copy replication from volume 123 in storage system 121 to volume 806 in remote storage system 141 is complex, cumbersome and requires competitive skills. Whereas under the invention, the users merely specify the desired protection and the protection is set up for them. The protection mechanism may be provided based on a service level objective or agreement and the user may be charged accordingly. An additional advantage of the invention is that, by having large local cache 104, the virtualization apparatus 101 can provide high performance access to a user of the virtualization apparatus 101 for storing data in volume 123, as compared with a configuration without virtualization apparatus 101 where the distance is very large from the application computer 111 to the storage system 121.

Figure 14:
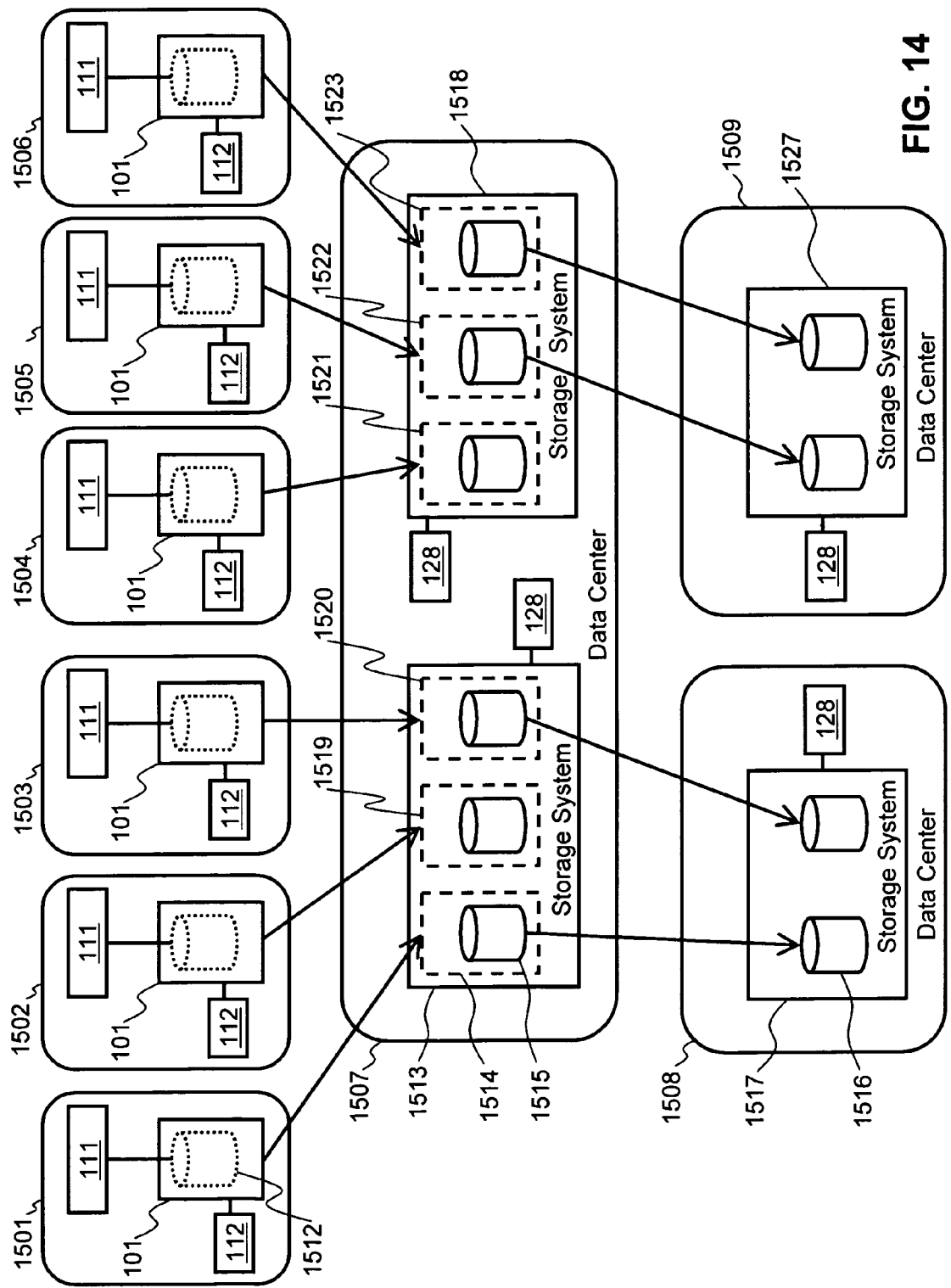
FIG. 14 illustrates another embodiment of the invention as applied to a large scale system with multiple data centers.

FIG. 14 illustrates a schematic view of another embodiment of the invention. A plurality of remote offices 1501-1506 are illustrated, with each remote office 1501-1506 including its own application computer 111, virtualization apparatus 101, and virtualization management terminal 112. Thus, each virtualization apparatus 101 is able to generate one or more virtual volumes, such as virtual volume 1512 which is represented on virtualization apparatus 101 at remote office 1501. As described above with the other embodiments, virtual volume 1512 is a virtual volume which represents a real volume 1515 located on a storage system 1513 at a data center 1507. The other remote offices 1502-1506 may also have the similar configurations for representing virtual volumes to users.

Data center 1507 may be a data center operated by a storage service provider which hosts several storage systems 1513 and 1518, each of which may include a management terminal 128. These storage systems 1513, 1518 may also be logically partitioned, so that, for example, storage system 1513 is partitioned into three logical sub-systems, 1514, 1519, and 1520, while storage system 1518 is partitioned into three logical sub-systems 1521, 1522, 1523. Only the resources in the partition 1514 are exposed to the virtualization apparatus 101 at remote office 1501 using access control technology such as zoning or LUN masking. In the embodiment illustrated, the real logical volume 1515 is a primary volume that is remotely copied to a secondary volume 1516 that is located in a storage system 1517 in another data center 1508, which is remotely located from data center 1506. Data center 1509 is another data center that may be remotely located from both data centers 1507 and 1508, which includes at least one other storage system 1527. The function for storage of I/O operations and recovery are the same as in the embodiments described above, and thus, do not need to be repeated here. Further, as will be apparent to those skilled in the art, numerous different remote and local copy arrangements may be configured in the architecture illustrated in FIG. 14, with the describe arrangements being only exemplary.

Accordingly, the invention is able to reduce the level of expertise required for users to configure and manage storage systems and data protection. By installing a virtualization apparatus between an application computer and a storage system, an actual volume in the storage system is provided for the user's application computer via the virtualization apparatus as if the storage media for the actual volume is located with the virtualization apparatus. The actual logical volume in the storage system may also be copied to a secondary volume in the same or a different storage system to provide data protection, and the user does not have to worry about configuring or managing the data protection.

Further, when choosing the real primary volume of the storage system, the virtualization apparatus retrieves the path information of the secondary volume. Then, if there should be a failure of the primary volume or storage system, the virtualization apparatus is able to switch the path to the secondary volume during failover. Additionally a central data center can be utilized, and this would typically include expert storage administrators able to provide complex storage system management services to the small remote office. Thereby, the functions required of the management system at remote offices can be reduced.

As mentioned above, if a remote office uses the management services offered by third party storage service providers without using the virtualization apparatus of the invention there will be a performance degradation to access volumes at storage systems at remote data centers. Thus, the invention is able to provide superior response time for write commands and some read commands by use of a locally-located cache 104. Additionally, under the invention, the administrator at the management terminal 112 does not have to know the resources of the target storage system for remote copy, because those configurations are performed at the management terminal 128 of the primary storage system. Rather, only the path to the secondary volume is required for conducting path switch at failover, and this information is obtained during initial set up.

Further, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of storing data, comprising:
   providing a virtualization apparatus including a memory, said virtualization apparatus being able to present a virtual volume to a computer that sends data to said virtual volume;
   designating a first logical volume on a first storage system for storing the data sent to said virtual volume;
   selecting a data protection scheme for said first logical volume as a first information;
   sending said first information to said first storage system;
   receiving at the virtualization apparatus a second information including a path to a second logical volume selected at said first storage system, said second logical volume being designated to receive a copy of data stored to said first logical volume;
   storing to said first logical volume the data sent to said virtual volume;
   copying the data stored to said first logical volume to said second logical volume according to said selected data protection scheme; and
   providing a storage management terminal to manage configuration of resources of the second logical volume, the storage management terminal being separate from a virtualization management terminal which is coupled to the virtualization apparatus to manage configuration of the virtualization apparatus.

2. A method according to claim 1, further including steps of
   detecting an error in I/O operations to said first logical volume; and
   switching a path at said virtualization apparatus from the first logical volume to said second logical volume, whereby data stored to said virtual volume is copied to said second logical volume instead of said first logical volume.

3. A method according to claim 2, further including steps of returning an error to said computer if any write record with a sequence number larger than the latest sequence number is missing from said memory of said virtualization apparatus.

4. A method according to claim 1, further including a step of
   providing a second storage system separate from said first storage system, said second logical volume being located on said second storage system and forming part of a replication pair with said first logical volume.

5. A method according to claim 4, further including a step of
   copying said data on said first logical volume to said second logical volume on said second storage system and also periodically copying said data on said first logical volume to a third logical volume on said first storage system as a local snapshot.

6. A method according to claim 1, further including steps of periodically stopping processing of said computer; and
   flushing the memory of said virtualization apparatus by storing to said first logical volume all write data in said virtual volume received from said computer that has not yet been stored to said first logical volume.

* * * * *